(12) United States Patent
Nishimura (10) Patent No.: US 9,587,731 B2
(45) Date of Patent: Mar. 7, 2017

(54) LUBRICATING APPARATUS FOR ROTATING SHAFT

(71) Applicant: KAWASAKI JUKOGYO KABUSHIKI KAISHA, Hyogo (JP)

(72) Inventor: Shigeru Nishimura, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 570 days.

(21) Appl. No.: 14/010,890

(22) Filed: Aug. 27, 2013

(65) Prior Publication Data

US 2015/0060207 A1 Mar. 5, 2015

(51) Int. Cl.
*F16H 57/04* (2010.01)

(52) U.S. Cl.
CPC ....... *F16H 57/043* (2013.01); *F16H 57/0434* (2013.01)

(58) Field of Classification Search
CPC ............... F16H 57/043; F16H 57/0434; F16H 57/0421; F16H 57/042; F16H 57/0424
USPC ....................................................... 184/6.12
See application file for complete search history.

(56) References Cited

U.S. PATENT DOCUMENTS

| | | | | |
|---|---|---|---|---|
| 2,049,234 A * | 7/1936 | Thomas | .............. | F16H 57/0421 184/11.1 |
| 4,222,283 A * | 9/1980 | Nagy | ..................... | F16H 3/089 184/11.2 |
| 4,231,266 A * | 11/1980 | Nishikawa | .......... | F16C 33/6659 184/11.1 |
| 4,480,493 A * | 11/1984 | Takahashi | ........... | F16H 57/0494 184/6.12 |
| 4,644,815 A * | 2/1987 | Kawano | .................. | F16H 3/089 184/6.12 |
| 8,840,511 B2 * | 9/2014 | Seno | .................... | F16H 57/0423 184/6.12 |
| 8,939,257 B2 * | 1/2015 | Nakamura | ............ | F16D 25/123 184/6.12 |
| 2013/0305878 A1 * | 11/2013 | Seno | .................... | F16H 57/0423 74/665 A |
| 2013/0333506 A1 * | 12/2013 | Newberry | ............... | B64C 27/14 74/467 |
| 2014/0213405 A1 * | 7/2014 | Ishikawa | ............... | F16H 57/027 475/160 |

FOREIGN PATENT DOCUMENTS

| | | |
|---|---|---|
| EP | 0 984 207 | 2/2003 |
| JP | 61-12451 | 4/1986 |

* cited by examiner

*Primary Examiner* — William E Dondero
*Assistant Examiner* — Mark K Buse
(74) *Attorney, Agent, or Firm* — Wenderoth, Lind & Ponack, L.L.P.

(57) ABSTRACT

A lubricating apparatus includes a rotating shaft disposed horizontally; a supporting wall supporting the rotating shaft with a bearing; an oil chamber surrounded by the supporting wall and the rotating shaft; an oil passage extending within the rotating shaft and communicating with lubricating portions; an oil intake portion for receiving and supplying the oil to the oil chamber; and a plurality of guide ribs formed in the supporting wall. The guide ribs are adapted to form at least two oil flow paths from a radially-outer portion of the oil chamber toward a center portion of the chamber.

9 Claims, 10 Drawing Sheets

LUBRICATING APPARATUS FOR ROTATING SHAFT

BACKGROUND OF THE INVENTION

1. Field of the Invention

The present invention relates to a lubricating apparatus for a rotating shaft and, more particularly, relates to a lubricating apparatus for introducing oil into an oil passage in the rotating shaft from the outside and supplying the oil to portions where gears and like are fitted to the outer peripheral surface of the rotating shaft.

2. Description of the Related Art

The lubricating apparatus as described above, for example, have been used for lubricating portions where a speed-change gear are fitted on a speed-change shaft, in a gear-type transmission. As a system for supplying oil into the oil passage in a rotating shaft from the outside, there have been a forced-supply system utilizing an oil pump, and a natural supply system utilizing water-head differential pressure (head differential pressure) in oil. Such the forced-supply system hardly induces shortage of the amount of oil supplied to the oil passage in the rotating shaft, except in the event of failures of the oil pumps, and the like. However, such the natural supply system may induce shortage of the amount of oil supplied to the oil passage, in the event of reduction of the water-head differential pressure. Namely, within an oil chamber to which the oil passage is opened, oil is moved outwardly in the radial direction and is pressed against the inner peripheral surface of the peripheral wall of the oil chamber, due to centrifugal forces based on the rotations of the end surface of the rotating shaft and an inner ring in a bearing. When the water-head differential pressure is lower, oil hardly flows into the oil passage from the oil chamber, since oil can not overcome the centrifugal force.

Figure 11:
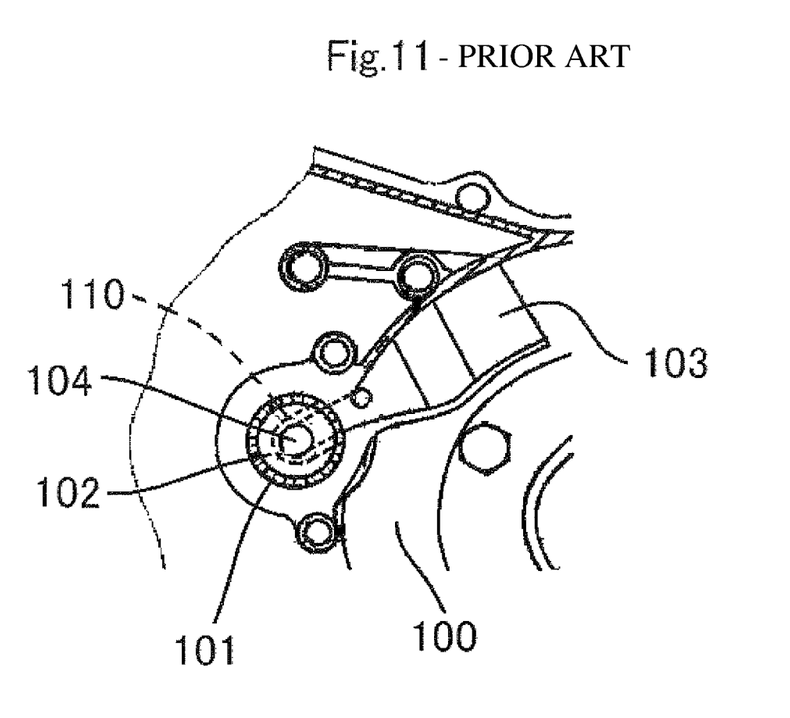
FIG. 11 is a cross-sectional view of a conventional example.

As a countermeasure against shortages in the amount of oil supply, Japanese Examined Utility Model (Registration) Application Publication No. 61-12451 discloses a lubricating apparatus which is provided with an oil guide 110, as illustrated in FIG. 11. The structure of FIG. 11 will be described briefly. A speed-change shaft 102 is rotatably supported by a side wall 100 of a transmission case with a bearing 101 interposed therebetween, and the speed-change shaft 102 is provided, in its shaft center line portion, with an oil passage 104 extending in the axial direction. On the inner surface of the side wall 100, the oil guide 110 is provided such that the oil guide 110 extends from an oil receiver 103 and reaches an opening of the oil passage 104 in the speed-change shaft 102. The oil receiver 103 is supplied with oil having been scraped away by a rotating ring gear, and the oil is supplied to the oil passage 104 through the oil guide 110 due to a water-head differential pressure therein.

However, the oil guide 110 in FIG. 11 forms only the single oil flow path which extends from the oil receiver 103 and reaches the oil passage 104. Therefore, when the water-head differential pressure is lower, and there are larger centrifugal forces based on the rotation of the speed-change shaft 102, the amount of oil supplied to the oil passage 104 may be reduced.

SUMMARY OF THE INVENTION

The present invention was made in view of the problem and aims at providing a rotating-shaft lubricating apparatus capable of supplying sufficient oil to an oil passage within a rotating shaft, anytime, regardless of whether a water-head differential pressure in the lubricating oil is higher or lower and regardless of whether the rotating speed of the rotating shaft is higher or lower.

In order to solve the above problems, the present invention provides a rotating-shaft lubricating apparatus including: a rotating shaft disposed horizontally; a supporting wall adapted to rotatably support an end portion of the rotating shaft in an axial direction, with a bearing interposed therebetween; an oil chamber surrounded by the supporting wall and an end surface of the rotating shaft in the axial direction; an oil passage which is opened to the oil chamber through the end surface of the rotating shaft, further extends in the axial direction within the rotating shaft and is communicated with one or more lubricating portion(s) in an outer peripheral surface of the rotating shaft; an oil intake portion for taking in oil from outside the oil chamber and for supplying the oil to the oil chamber; and a plurality of guide ribs formed in the supporting wall, the guide ribs being adapted to form at least two oil flow paths from a radially-outer portion of the oil chamber toward a center portion which is coincident with an opening in the oil passage.

With the structure, when the rotating shaft is rotating, it is possible to direct oil toward the center portion from radially-outer sides, through at least two oil flow paths, due to centrifugal forces, and therefore, it is possible to efficiently and rapidly supply the oil within the oil chamber into the oil passage of the rotating shaft. This can prevent shortages of the amounts of oil supplied to respective lubricating portions.

In the present invention, preferably, the guide ribs are shaped such that the oil having been pressurized by centrifugal forces from the rotating shaft flow toward the center portion through the respective oil flow paths, and at least two or more oil flows are pressed against each other in any of the oil flow paths.

With above the structure, when the rotating shaft is rotating, the oil flowing toward the center portion through the respective oil flow paths by being guided by the respective guide ribs are caused to impinge on each other to be increased in pressure, so that the oil within the oil chamber can be efficiently supplied to the inside of the oil passage. This enables thorough lubrication in the respective lubricating portions.

In the present invention, preferably, the guide ribs are formed integrally with the supporting wall. For example, they are formed integrally therewith, through casting or die casting.

With above the structure, it is possible to prevent an increase of the number of members and, furthermore, it is possible to facilitate the fabrication of the guide ribs.

In the present invention, the guide ribs can be also formed as members separated from the supporting wall and can be fixed to the supporting wall through proper fixing means.

Upon explaining one example of the guide rib according to the present invention, among of the plurality of the guide ribs, one guide rib is formed to have a substantially-U shape having a bottom portion surrounding the center portion at its lower side, and opposite side portions extending upwardly from opposite ends of the bottom portion, when viewed in the axial direction of the rotating shaft, another guide rib is formed to have a substantially-I shape which extends downwardly from an upper end of the inner peripheral wall surface and protrudes between the opposite side portions of the one guide rib having the substantially-U shape, and the two oil flow paths are formed between opposite side surfaces of the another guide rib having the substantially-I shape and the opposite side portions of the one guide rib having the substantially-U shape.

With above the structure, regardless of whether the rotating shaft is rotating in the normal rotational direction or in the reverse rotational direction, it is possible to efficiently supply oil to the oil passage.

Upon explaining another example of the guide rib according to the present invention, among the plurality of the guide ribs, one guide rib is shaped to extend downwardly in a substantially-straight-line from an upper portion of the inner peripheral wall surface and to reach a vicinity of one end of the center portion in a horizontal direction, another guide rib is shaped to extend upwardly in a substantially-straight-line from a lower portion of the inner peripheral wall surface and to reach a vicinity of the other end of the center portion in the horizontal direction, and the respective oil flow paths are formed along respective surfaces of the guide ribs which are faced to the center portion.

With above the structure, it is possible to simplify the shapes of the guide ribs.

Upon explaining still another example of the guide rib according to the present invention, the plurality of the guide ribs include a pair of main guide ribs which extend in the radial direction from outer peripheral ends of the center portion to reach the inner peripheral wall surface and are placed to have a phase difference of 180 degrees therebetween about a center of the center portion, and a pair of sub guide ribs which are provided at a substantially-center portion of the oil chamber, at positions substantially parallel with the main guide ribs, and the respective oil flow paths are formed along side surfaces of the respective main guide ribs.

With above the structure, it is possible to simplify the shapes of the guide ribs. Furthermore, regardless of whether the rotating shaft is rotating in the normal rotational direction or in the reverse rotational direction, it is possible to efficiently supply oil to the oil passage.

Upon explaining still another example of the guide rib according to the present invention, the plurality of the guide ribs include four guide ribs formed to have a substantially-sectorial shape when viewed in the axial direction of the rotating shaft, and the four guide ribs form a plurality of oil flow paths intersecting with each other in a substantially-cross shape at the center portion.

With above the structure, regardless of whether the rotating shaft is rotating in the normal rotational direction or in the reverse rotational direction, it is possible to efficiently supply oil to the oil passage.

In the present invention, preferable, the rotating shaft includes a speed-change shaft which is one of a plurality of rotating shafts in a gear-type transmission, and a plurality of speed-change gears are rotatably supported thereon with a needle bearing interposed therebetween.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PROFFERED EMBODIMENTS

With reference to FIGS. 1 to 6, there will be described an apparatus for lubricating a rotating shaft according to a first embodiment of the present invention. It is to be noted that, for convenience of description, the forward and rearward directions of a vehicle will be referred to as forward and rearward directions of respective members, and, in the vehicle-widthwise direction, the left and right sides of the vehicle when viewed from a person riding in the vehicle (the left and right sides of the vehicle when viewed from behind the vehicle) will be referred to as left and right sides of the vehicle and the respective members, for giving description hereinafter.

Figure 1:
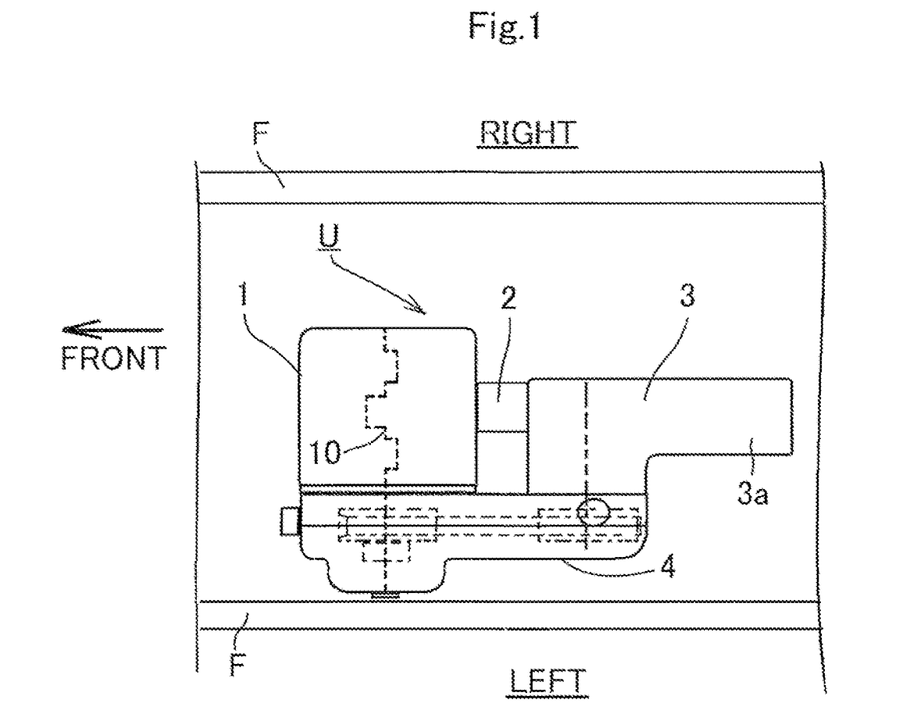
FIG. 1 is a plan view of a vehicle power unit including a lubricating apparatus in a first example of the present invention.
Figure 2:
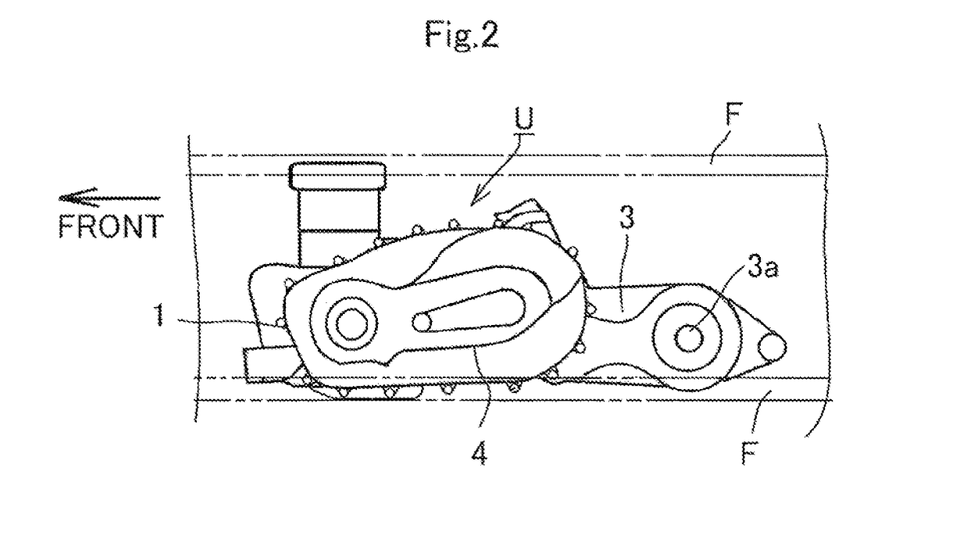
FIG. 2 is a left side view of FIG. 1.

FIG. 1 is a plan view of a vehicle power unit, wherein a power unit U is mounted in a vehicle-body frame F of a utility vehicle, for example, and includes an engine 1, a gear-type transmission 3 coupled to the rear side of the engine 1 with a coupling bracket 2 interposed therebetween, and a V-belt type continuously variable transmission 4 which couples a crank shaft 10 in the engine 1 to an input shaft 11 in the gear-type transmission 3. The V-belt type continuously variable transmission 4 is mounted therein such that the V-belt type continuously variable transmission 4 extends from a left side surface of the engine 1 to a left side surface of the gear-type transmission 3. FIG. 2 is a left side view of the power unit U, wherein the gear-type transmission 3 is integrally provided with a wheel final speed reducer 3a, at its rear end portion.

Figure 3:
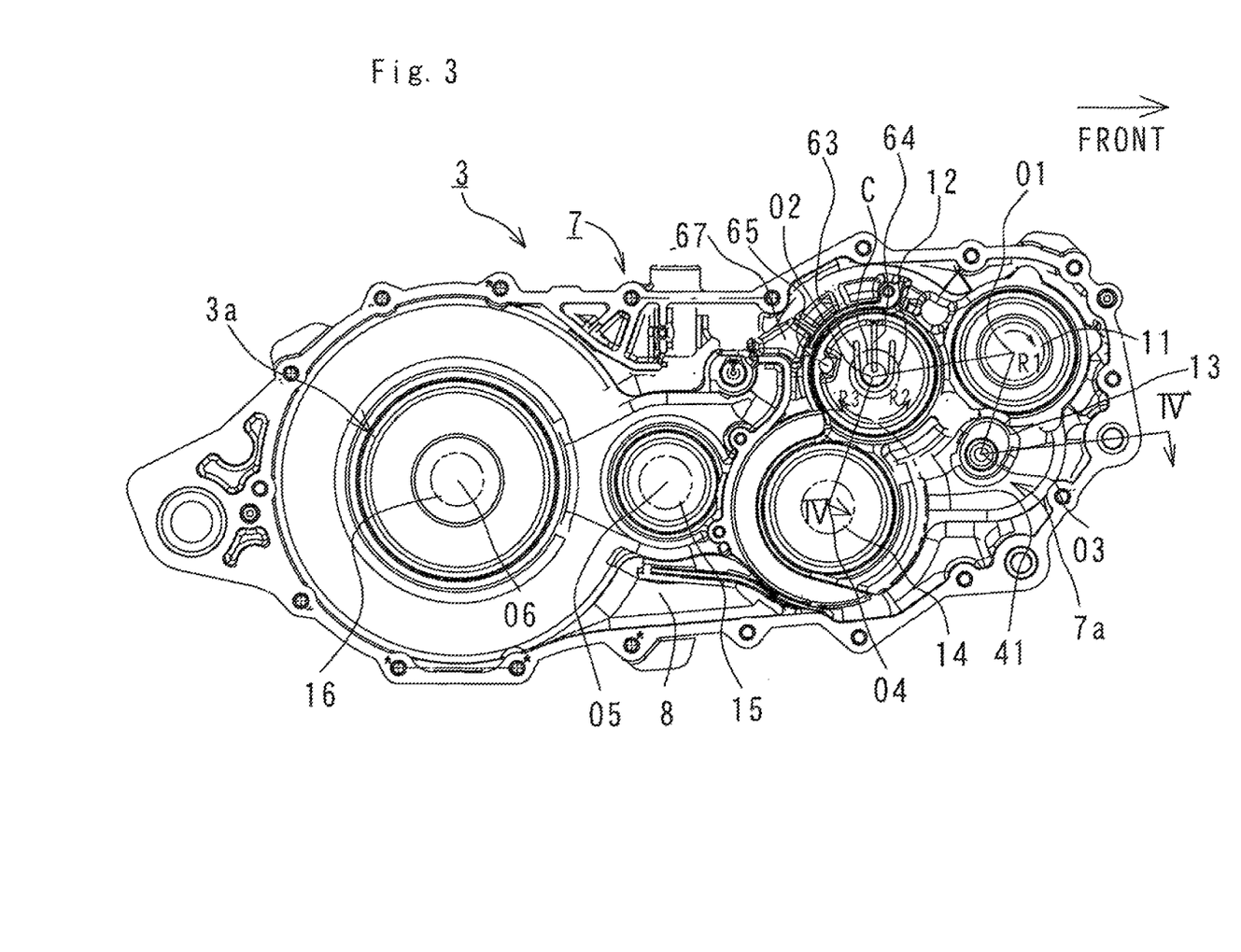
FIG. 3 is an inside view of a left side wall of a gear-type transmission in the vehicle power unit in FIG. 1 (right side view).

FIG. 3 is an inside view (right side view) of a left side wall 8 of a transmission case 7, wherein, within the transmission case 7, there are placed the input shaft 11 having a shaft center line O1, a speed-change shaft 12 having a shaft center line O2, a reverse idle shaft 13 having a shaft center line O3, a power take-off shaft 14 having a shaft center line O4, a pinion gear shaft 15 having a shaft center line O5 in the final speed reducer 3a, and a larger gear shaft 16 (rear wheel shaft) having a shaft center line (rear wheel center line) O6 in the final speed reducer 3a.

Figure 4:
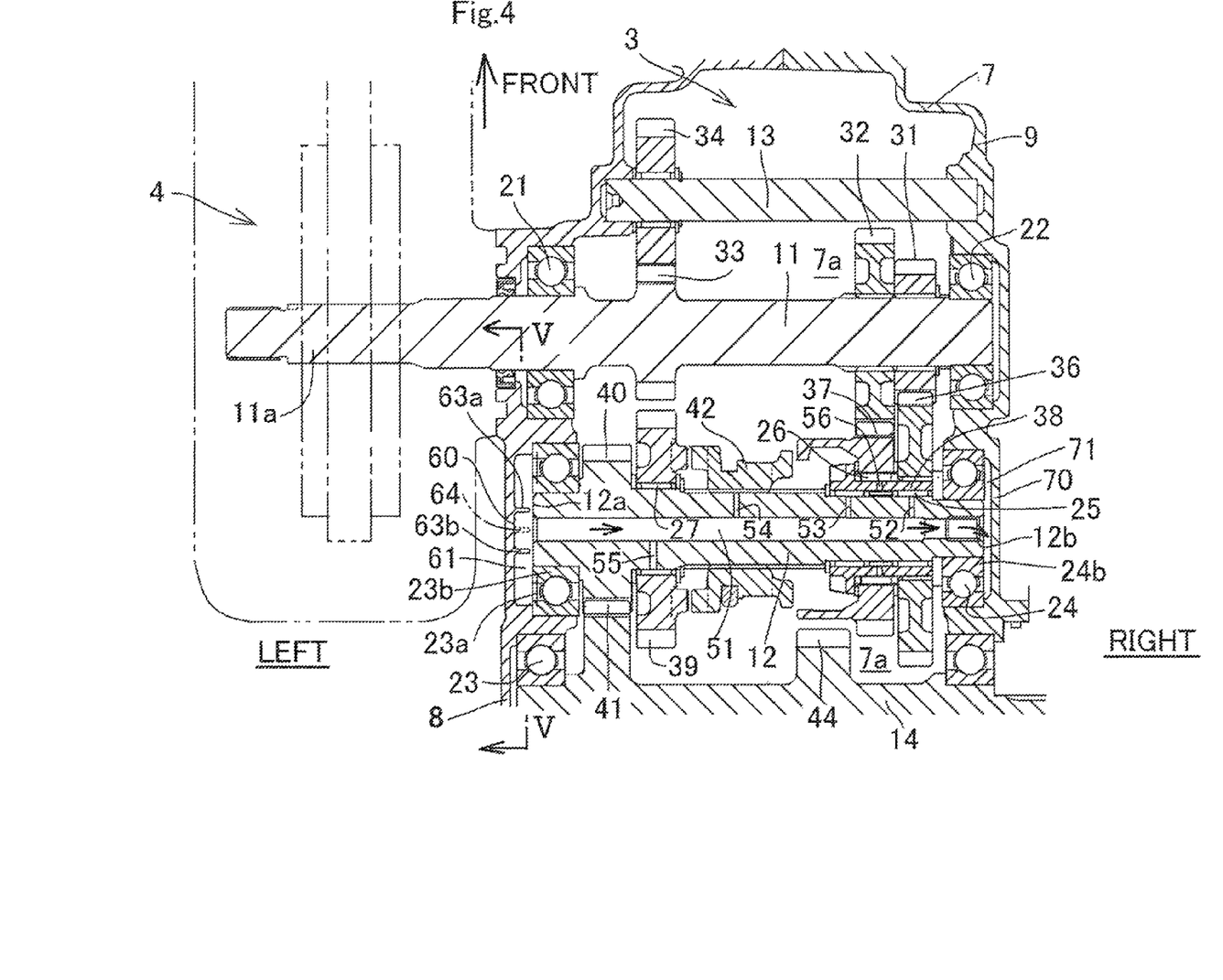
FIG. 4 is a cross-sectional view taken along IV-IV in FIG. 3.

FIG. 4 is a cross-sectional view taken along IV-IV in FIG. 3, wherein the input shaft 11 is rotatably supported by the left side wall (supporting wall) 8 and a right side wall (supporting wall) 9 of the transmission case 7, with ball bearings 21 and 22 interposed therebetween, respectively, and the left end portion of the input shaft 11 is protruded into the case of the V-belt-type continuously variable transmission 4 and is integrally provided with a follower-side pulley shaft 11a. An input-side lower-speed gear 31 and an input-side higher-speed gear 32 are fixed to the input shaft 11 near its right end portion, and an input-side reverse gear 33 is formed integrally with the input shaft 11 near the left end portion of the input shaft 11. The input-side reverse gear 33 engages with a reverse idle gear 34 which is free-rotatably fitted to the reverse idle shaft 13.

The speed-change shaft 12 is rotatably supported by the left side wall 8 and the right side wall 9 of the transmission case 7, with ball bearings 23 and 24 interposed therebetween, respectively. An output-side lower-speed gear 36 engaging with the input-side lower-speed gear 31, and an output-side higher-speed gear 37 engaging with the input-side higher-speed gear 32 are free-rotatably fitted thereto, near the right end portion of the speed change shaft 12. The output-side lower-speed gear 36 is fixed to the outer peripheral surface of a cylindrical shaft 38 through spline fitting, and the cylindrical shaft 38 is free-rotatably fitted to the outer peripheral surface of the speed-change shaft 12 with a needle bearing 25 interposed therebetween. The output-side higher-speed gear 37 is free-rotatably fitted to the outer peripheral surface of the cylindrical shaft 38 with a needle bearing 26 interposed therebetween. Near the left end portion of the speed-change shaft 12, an output-side reverse gear 39 engaging with the reverse idle gear 34 is free-rotatably fitted to the speed-change shaft 12 with a needle bearing 27 interposed therebetween, and an output gear 40 is formed integrally with the speed-change shaft 12. The output gear 40 engages with a power take-off gear 41 on the power take-off shaft 14. Between the output-side higher-speed gear 37 and the output-side reverse gear 39, there is placed a shift sleeve 42, and the shift sleeve 42 is spline-fitted on the outer peripheral surface of the speed-change shaft 12 such that the shift sleeve 42 can move in the axial direction. Between the opposite end portions of the shift sleeve 42 in the axial direction, and the output-side gears 36, 37 and 39, there are provided respective dog clutches. Namely, by moving the shift sleeve 42 in the axial direction through a shift operation mechanism, which is not illustrated, it is possible to perform changeovers among three speed-change stages, which are a forward-traveling high-speed state, a forward-traveling low-speed state, and a rearward-traveling state.

A rear-wheel driving transmission gear 44 is formed integrally with the power extraction shaft 14. The power take-off shaft 14 is coupled, at its right end portion, to a front-wheel driving shaft, such that a two-wheel-drive/four-wheel-drive changeover mechanism, which is not illustrated, is interposed therebetween.

Lubricating Apparatus for the Speed-Change Shaft (Rotating Shaft) 12

The speed-change shaft 12 includes an oil passage 51 extending in the axial direction in its shaft center line portion, and includes a plurality of oil holes 52, 53, 54 and 55 extending in the radial direction. The oil passage 51 is opened at its opposite ends in the axial direction. Among the plurality of oil holes 51, the two oil holes 52 and 53 formed in the right-half portion of the speed-change shaft 12 communicate with the needle bearing 25 on the inner periphery of the cylindrical shaft 38, while the oil hole 54 formed in the speed-change shaft 12 in its middle portion in the axial direction communicates with the spline-fitting portion in the inner periphery of the shift sleeve 42. The oil hole 55 formed in the speed-change shaft 12 near its left end portion communicates with a needle bearing 27 on the inner periphery of the output-side reverse gear 39. Further, the cylindrical shaft 38 is provided with a sub oil hole 56 which penetrates therethrough in the radial direction, and the sub oil hole 56 allows the needle bearing 25 on the inner periphery of the cylindrical shaft 38 to communicate with the needle bearing 26 on the outer periphery thereof.

The left ball bearing 23 which supports the left end portion of the speed-change shaft 12 has a seal 23a at its left end portion. The seal 23a, an inner ring 23b in the left ball bearing 23, a left end surface 12a of the speed-change shaft 12, and a concave portion 60 formed in the left side wall 8 of the transmission case 7 form or enclose an oil chamber 61. The oil passage 51 in the speed-change shaft 12 is opened, at its left end, to the oil chamber 61. The right ball bearing 24 which supports the right end portion of the speed-change shaft 12 has no seal. An inner ring 24b in the right ball bearing 24, a concave portion 70 formed in the right side wall 9 of the transmission case 7, and a right end surface 12b of the speed-change shaft 12 form or enclose an oil exhaust room 71. The oil exhaust room 71 communicates with the inside of a transmission room 7a, through the inside of the right ball bearing 24.

Figure 5:
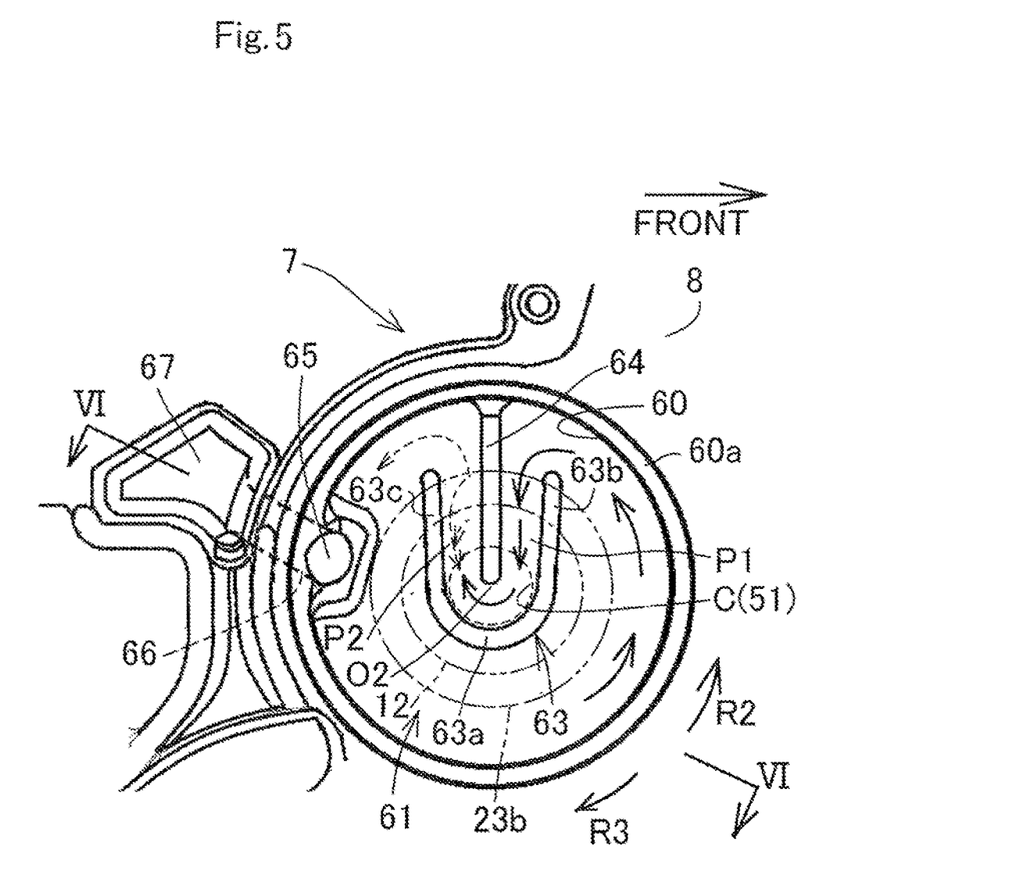
FIG. 5 is a cross-sectional view taken along V-V in FIG. 4.

FIG. 5 is an enlarged cross-sectional view taken along V-V in FIG. 4, wherein the concave portion 60 formed in the left side wall 8 has a peripheral wall 60a formed in a substantially-circular shape. The oil chamber 61 has a center portion C which is substantially coincident, in size and position, with the oil passage 51 in the speed-change shaft 12. Further, the oil chamber 61 has an oil inlet 65 at its rear end portion, and the oil inlet 65 communicates with an oil intake passage 66 formed in the left side wall 8. The oil intake passage 66 extends rearwardly and upwardly and communicates with an oil intake room 67 formed posteriorly to the rear end of the peripheral wall 60a (outside the oil chamber 61).

Within the oil chamber 61, there are provided first and second guide ribs 63 and 64, in order to direct oil at radially-outer portions, namely oil near the peripheral wall 60a, toward the center portion C, utilizing the rotation of the speed-change shaft 12. In the first embodiment, the first and second guide ribs 63 and 64 are formed integrally with the left side wall 8. The first guide rib 63 has a bottom portion 63a with a half-circular (semi-circular) shape which surrounds the center portion C at its lower side, and opposite side portions 63b and 63c with a straight-line shape and which extend upwardly from the opposite ends of the bottom portion 63a, when viewed in the axial direction. The entire first guide rib 63 is formed to have a substantially U shape. The opposite side portions 63b and 63c are faced, at their upper ends, to the peripheral wall 60a, from a radially-inner side, with a certain interval interposed therebetween. The second guide rib 64 extends downwardly in a substantially-straight-line from the upper end portion of the peripheral wall 60a, further protrudes between the opposite side portions 63b and 63c of the first guide rib 63 and reaches the vicinity of the shaft center line O2 of the speed-change shaft 12. The entire second guide rib 64 is formed to have a substantially I shape. A first oil flow path P1 is formed between the second guide rib 64 and the front side portion 63b of the first guide rib 63, and a second oil flow path P2 is formed between the second guide rib 64 and the rear side portion 63c of the first guide rib 63. The first oil flow path P1 and the second oil flow path P2 extend downwardly from the upper end of the oil chamber 61 and encounter each other at the center portion C.

Figure 6:
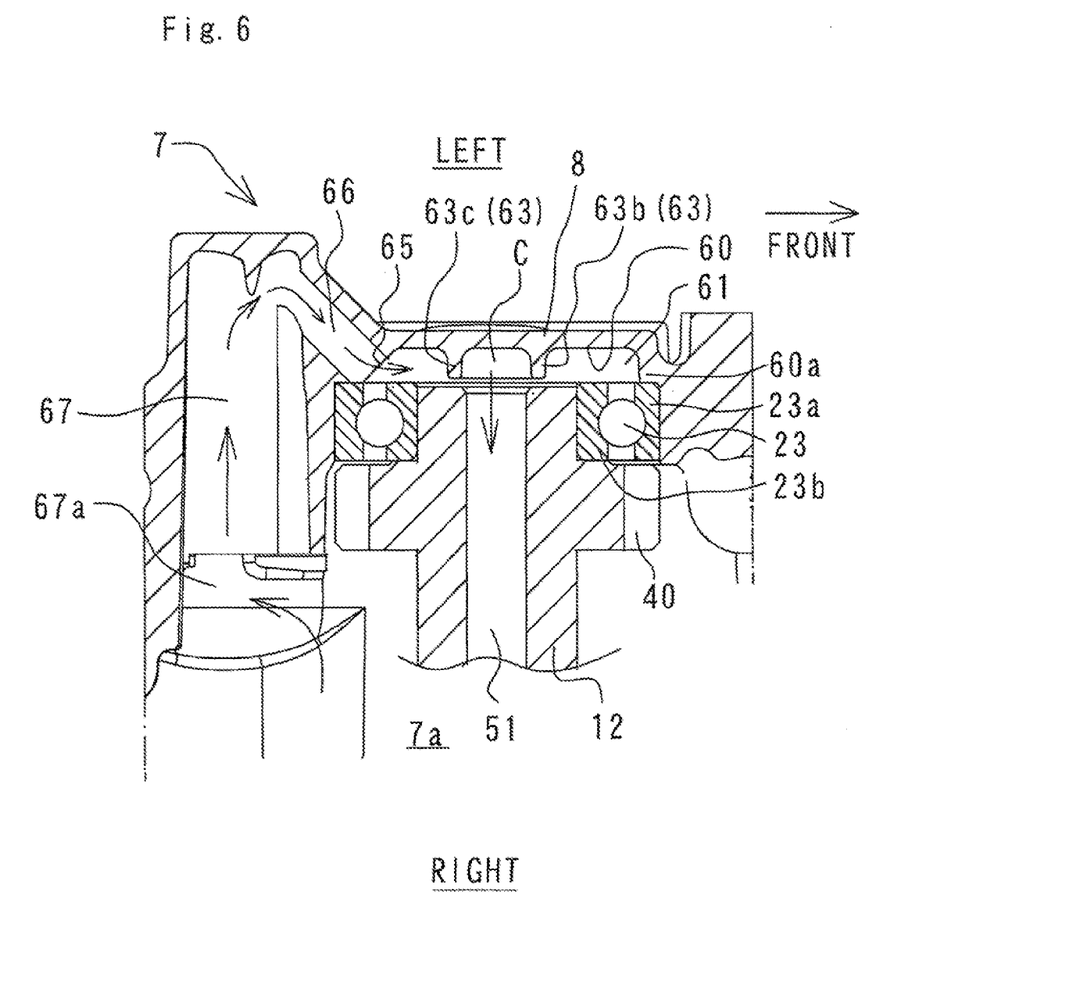
FIG. 6 is a cross-sectional view taken along VI-VI in FIG. 5.

FIG. 6 is a cross-sectional view taken along VI-VI in FIG. 5, wherein the oil intake room 67 extends rightwardly through the left side wall 8, and the oil intake room 67 is provided, in its right end portion, with a cup-shaped oil receiver portion 67a having an upper surface which is opened to the transmission room 7a. The oil receiver portion 67a is capable of receiving oil having been scraped away by the power extraction gear 41 on the power extraction shaft 14 illustrated in FIG. 3, for example.

Effects

Referring to FIG. 3, the input shaft 11 is rotated in the direction of an arrow R1, anytime, regardless of whether the vehicle is traveling forwardly or rearwardly. The speed-change shaft 12 is rotated in the direction of an arrow R2 (in the normal rotational direction) during forward traveling and is rotated in the direction of an arrow R3 (in the reverse rotational direction) during rearward traveling.

Referring to FIG. 5, as described above, when the vehicle is traveling forwardly, the speed-change shaft 12 is rotating in the direction of the arrow R2, and oil within the oil chamber 61 moves in the direction R2 of rotations of the speed-change shaft 12 and the inner ring 23b in the bearing 23, and is pressed against the inner surface of the peripheral wall 60a due to centrifugal forces. At the upper end portion of the front-half portion of the oil chamber 61, oil impinges on the front surface of the second guide rib 64 at its upper portion, from a front side thereto, and this oil is guided inwardly in the radial direction by the second guide rib 64, and thus, flows toward the center portion C through the first oil flow path P1. The oil having reached the center portion C turns upwardly in a U shape at the bottom portion 63a and tries to flow upwardly through the second oil flow path P2.

On the other hand, at the upper end portion of the rear-half portion of the oil chamber 61, as indicated by broken-line arrows, a portion of the oil impinges on the upper end portion of the rear side portion 63c of the first guide rib 63, from a front side thereto, and is guided toward the center portion C through the second oil flow path P2, due to the rotations of the speed-change shaft 12 and the inner ring 23b in the bearing 23 in the rotational direction R2.

The first oil flow having passed through the first oil flow path P1 and turned in an U shape at the bottom portion 63a, and the second oil flow flowing downwardly through the second oil flow path P2 impinge on each other halfway through the second oil flow path P2, which increases the pressures at the position of this impingement and in the vicinity thereof.

The oil having been increased in pressure at the position of the impingement and in the vicinity thereof as described above is efficiently supplied to the inside of the oil passage 51 from the center portion C of the oil chamber 61.

Referring to FIG. 4, the oil having been supplied to the inside of the oil passage 51 in the speed-change shaft 12 from the oil chamber 61 flows rightwardly through the oil passage 51. Further, halfway therethrough, this oil is supplied to respective lubricating portions through the respective oil holes 52, 53, 54 and 55 to lubricate the respective lubricating portions. Namely, the oil flowing into the leftmost oil hole 55 is supplied to the needle bearing 27 on the output-side reverse gear 39, the oil flowing into the axially-middle oil hole 54 is supplied to the spline-fitting portion in the shift sleeve 42, and the oil flowing into the right two oil holes 52 and 53 is supplied to the needle bearing 25 on the inner side of the cylindrical shaft 36. Further, the oil flowing into the oil hole 56 in the cylindrical shaft 38 is supplied to the needle bearing 26 on the output-side higher-speed gear 37.

The oil having reached the right end of the oil passage 51 without flowing into the respective oil holes 52, 53, 54 and 55 is exhausted to the oil exhaust room 71 through the right-end opening of the oil passage 51, further passes through the right ball bearing 24 and is returned to the transmission room 7a.

Referring to FIG. 5, when the vehicle is traveling rearwardly, the speed-change shaft 12 is rotating in the direction of an arrow R3, and the oil within the oil chamber 61 is moved in the same direction as the direction R3 of rotations of the speed-change shaft 12 and the inner ring 23b in the bearing 23, and is pressed against the inner surface of the peripheral wall 60a due to centrifugal forces. During rearward traveling, the speed-change shaft 12 is rotating in the opposite direction from that during forward traveling, and therefore, the oil is flowing in the opposite direction, similarly. Accordingly, during rearward traveling, the second oil flow path P2 performs the function of the first oil flow path P1 during forward traveling. Further, during rearward traveling, the first oil flow path P1 performs the function of the second oil flow path P2 during forward traveling. Accordingly, the first and second oil flows impinge on each other halfway through the first oil flow path P1 to be increased in pressure, and thus are efficiently supplied to the inside of the oil passage 51 in the speed-change shaft 12.

As described above, in the first embodiment, regardless of whether the speed-change shaft 12 is rotating in the rotational direction R2 during forward traveling or in the rotational direction R3 during rearward traveling, the oil within the oil chamber 61 can be efficiently supplied to the inside of the oil passage 51, using centrifugal forces based on the rotations of the speed-change shaft 12 and the inner ring 23b in the bearing 23.

Second Embodiment

Figure 7:
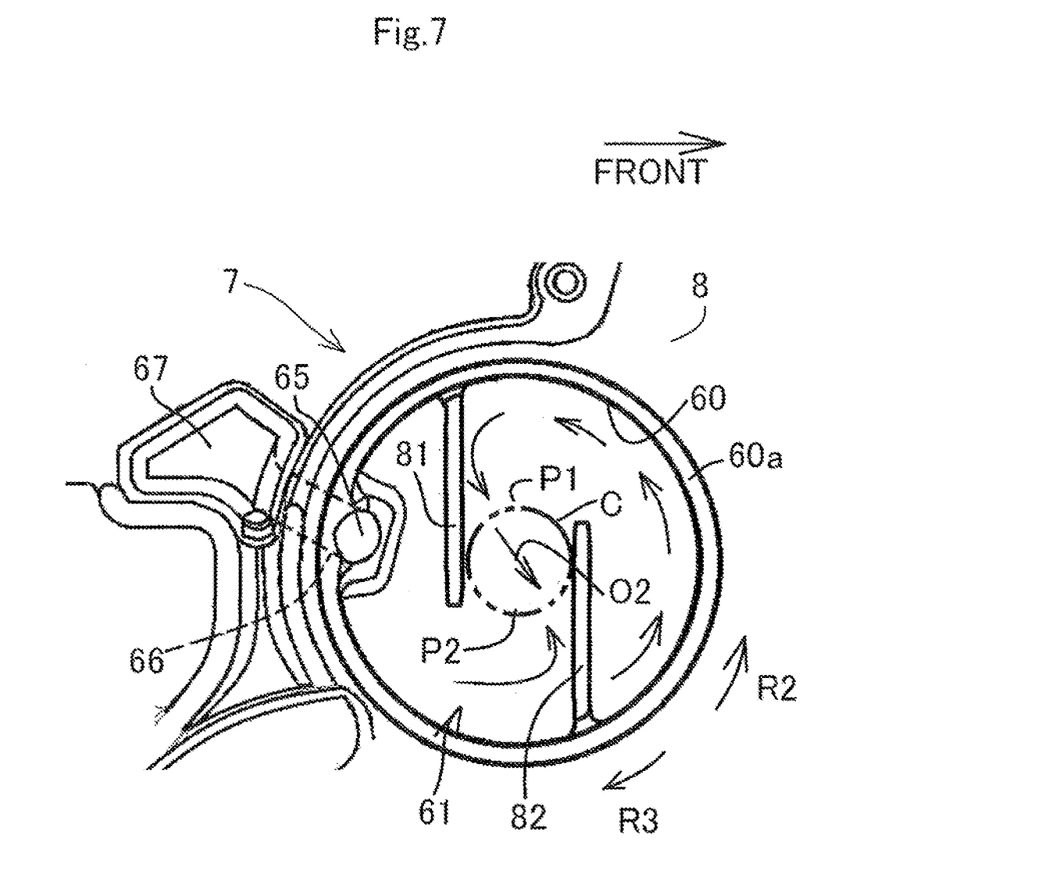
FIG. 7 is a cross-sectional view of a second example, which is similar to FIG. 5.

FIG. 7 is a cross-sectional view of a second embodiment, which is similar to FIG. 5 in the first embodiment. Referring to FIG. 7, within an oil chamber 61, there are provided a first guide rib 81 with a straight-line shape, and a second guide rib 82 with a straight-line shape. Both the guide ribs 81 and 82 are formed integrally with a left side wall 8 of a transmission case 7. The first guide rib 81 extends downwardly from a position which is slightly rearward to the upper end of a peripheral wall 60a and reaches the vicinity of the rear end of the center portion C. The second guide rib 82 extends upwardly from a position which is slightly forward to the lower end of the peripheral wall 60a and reaches the vicinity of the front end of the center portion C. A first oil flow path P1 is formed between the upper end portion of the second guide rib 82 and the portion of the first guide rib 81 above the shaft center line O2 of the speed-change shaft 12. On the other hand, a second oil flow path P2 is formed between the lower end portion of the first guide rib 81 and the portion of the second guide rib 82 below the shaft center line O2 of the speed-change shaft 12.

In the second embodiment, during forward traveling of the vehicle, only when the speed-change shaft 12 is rotating in the rotational direction R2, oil near the peripheral wall 60a can be guided to the center portion C.

Namely, the oil having impinged on the first guide rib 81 from a front side thereto in the upper end portion of the oil chamber 61 is guided downwardly through the first oil flow path P1 and reaches the center portion C. On the contrary, the oil having impinged on the second guide rib 82 from a rear side thereto in the lower end portion of the oil chamber 61 is guided upwardly by the second guide rib 82. The first oil flow flowing downwardly through the first oil flow path P1 is subjected to the gravity, so that the first oil flow from the upper side and the second oil flow from the lower side impinge on each other at a position slightly lower than the center portion C to be increased in pressure. Thus, the oil can be efficiently supplied to the inside of the oil passage 51.

Third Embodiment

Figure 8:
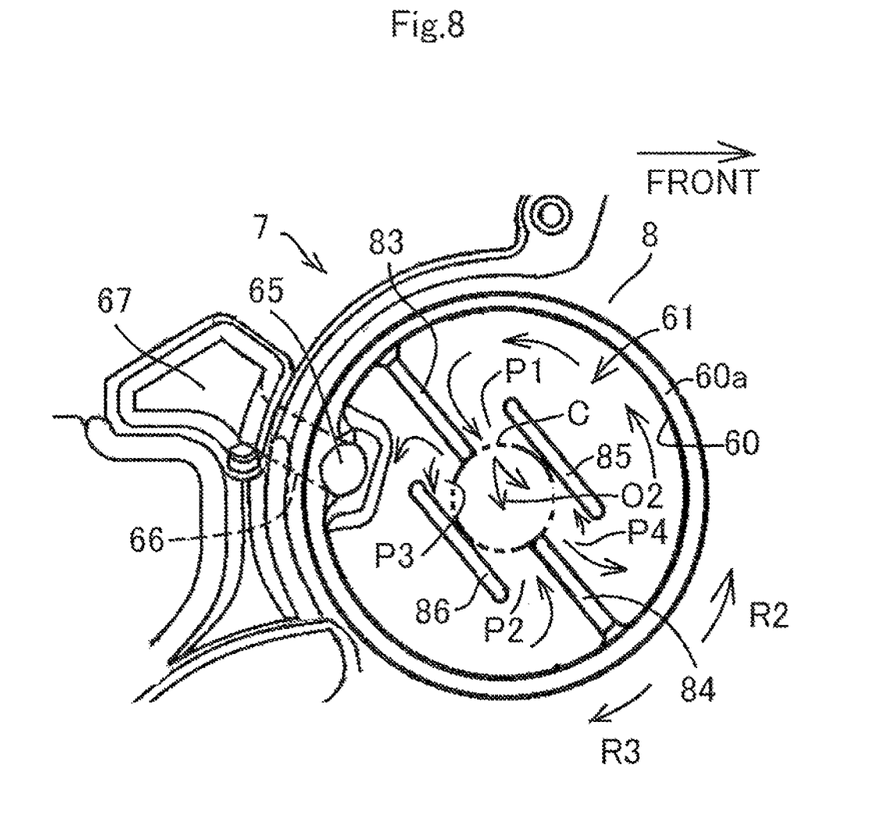
FIG. 8 is a cross-sectional view of a third example, which is similar to FIG. 5.

FIG. 8 is a cross-sectional view of a third embodiment, which is similar to FIG. 5 in the first example. Referring to FIG. 8, within an oil chamber 61, there are provided first and second main guide ribs 83 and 84 having a straight-line shape, and first and second sub guide ribs 85 and 86 having a straight-line shape. The first and second main guide ribs 83 and 84 and the first and second sub guide ribs 85 and 86 are formed integrally with a left side wall 8 of a transmission case 7.

The first main guide rib 83 extends forwardly and downwardly at an angle of about 45 degrees with respect to the horizontal direction from an upper rear end portion of a peripheral wall 60a and reaches an upper rear end of the center portion C. The second main guide rib 84 and the first main guide rib 83 are placed on substantially the same straight line (the straight line passing through the shaft center line O2). The second main guide rib 84 extends upwardly and rearwardly at an angle of about 45 degrees with respect to the horizontal direction from a lower front end portion of the peripheral wall 60a and reaches a lower front end of the center portion C.

The first and second sub guide ribs 85 and 86 are formed in parallel with the first and second main guide ribs 83 and 84. The first sub guide rib 85 is placed substantially in contact with an upper front end of the center portion C, and the second sub guide rib 86 is placed substantially in contact with a lower rear end of the center portion C. The first and second sub guide ribs 85 and 86 are formed to have a length larger than the diameter of the center portion C.

A first oil flow path P1 is formed between the first main guide rib 83 and the upper-half portion of the first sub guide rib 85, and a second oil flow path P2 is formed between the second main guide rib 84 and the lower-half portion of the second side guide rib 86. Further, a third oil flow path P3 is formed between the first main guide rib 83 and the upper-half portion of the second sub guide rib 86, and a fourth oil flow path P4 is formed between the second main guide rib 84 and the lower-half portion of the first sub guide rib 85.

When the speed-change shaft 12 is rotating in the direction of an arrow R2, oil flows forwardly and downwardly, mainly, through the first oil flow path P1, and also oil flows upwardly and rearwardly through the second oil flow path P2. Both the oil flows impinge on each other at a position slightly lower than the center portion C, due to the difference therebetween caused by the gravity, and thus, are increased in pressure. Further, portions of the oil are also guided from the third and fourth oil flow paths P3 and P4 toward the center portion C.

When the speed-change shaft 12 is rotating in the direction of an arrow R3, oil flows flowing toward the center portion C, mainly, through the third oil flow path P3 and through the fourth oil flow path P4 are caused to impinge on each other at the center portion C or at a position slightly lower than the center portion C. Further, portions of the oil are also guided from the first and second oil flow paths P1 and P2 toward the center portion C.

Fourth Embodiment

Figure 9:
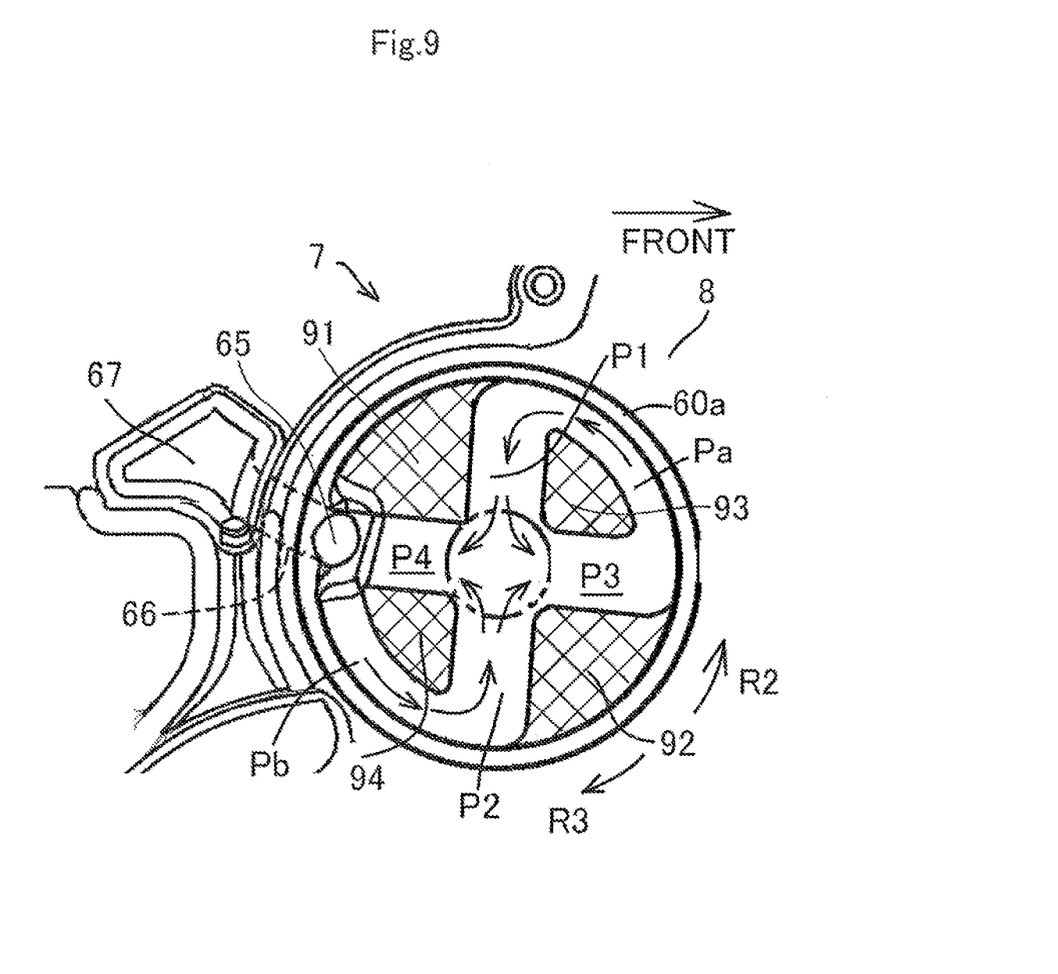
FIG. 9 is a cross-sectional view of a fourth example, which is similar to FIG. 5.

FIG. 9 is a cross-sectional view of a fourth embodiment, which is similar to FIG. 5 in the first embodiment. While, in the first to third embodiments, there are provided the guide ribs having the straight-line shapes or the U shape, in the fourth embodiment, there are provided four guide ribs 91, 92, 93 and 94 having a ¼-sectorial shape.

Within an oil chamber 61, a guide rib placed in an upper rear portion is referred to as the first guide rib 91, a guide rib placed in a lower front portion is referred to as the second guide rib 92, a guide rib placed in an upper front portion is referred to as the third guide rib 93, and a guide rib placed in a lower rear portion is referred to as the fourth guide rib 94. The pivot portions of the sectors of the first and second guide ribs 91 and 92 are positioned on outer peripheral ends of the center portion C, and the arc-shaped outer ends of the first and second guide ribs 91 and 92 reach a peripheral wall 60a. The pivot portions of the sectors of the third and fourth guide ribs 93 and 94 are positioned on outer peripheral ends of the center portion C, and the arc-shaped outer ends of the third and fourth guide ribs 93 and 94 are spaced apart from the inner surface of the peripheral wall 60a by a predetermined distance in the radial direction.

Between the first guide rib 91 and the third guide rib 93, there is formed a first oil flow path P1 with a straight-line shape which extends from an upper end of the peripheral wall 60a and reaches the center portion C. Between the second guide rib 92 and the fourth guide rib 94, there is formed a second oil flow path P2 with a straight-line shape which extends from a lower end of the peripheral wall 60a and reaches the center portion C. Between the second guide rib 92 and the third guide rib 93, there is formed a third oil flow path P3 with a straight-line shape which extends from a front end of the peripheral wall 60a and reaches the center portion C. Between the first guide rib 91 and the fourth guide rib 94, there is formed a fourth oil flow path P4 with a straight-line shape which extends from a rear end of the peripheral wall 60a and reaches the center portion C.

Further, between the inner surface of the peripheral wall 60a and the arc-shaped outer peripheral end of the third guide rib 93, there is formed a first arc-shaped oil flow path Pa which communicates the upper end portion of the first oil flow path P1 with the front end portion of the third oil flow path P3. Further, between the inner surface of the peripheral wall 60a and the arc-shaped outer peripheral end of the fourth guide rib 94, there is formed a second arc-shaped oil flow path Pb which communicates the lower end portion of the second oil flow path P2 with the rear end portion of the fourth oil flow path P4. Further, the oil flow paths P1, P2, P3 and P4 are formed to have a substantially-cross shape when viewed in their entirety.

If the speed-change shaft 12 is rotated in the direction of an arrow R2 during forward traveling of the vehicle, oil flows from the first arc-shaped oil flow path Pa into the first oil flow path P1, and the oil flows through the first oil flow path P1 toward the center portion C therebelow. Oppositely thereto, oil flows from the second arc-shaped oil flow path Pb into the second oil flow path P2, and the oil flows through the second oil flow path P2 toward the center portion C thereabove.

The oil flows in the first and second oil flow paths P1 and P2 are caused to impinge on each other at the center portion C or at a position slightly lower than the center portion C to be increased in pressure, and then these oil flows are supplied to the oil passage 51. A portion of the oil which has not flowed into the oil passage 51 is exhausted to the third and fourth oil flow paths P3 and P4 in the front and rear sides and is returned to the first and second arc-shaped oil paths Pa and Pb.

If the speed-change shaft 12 is rotated in the direction of an arrow R3, during rearward traveling of the vehicle, oil flows from the first arc-shaped oil flow path Pa into the third oil flow path P3, while oil flows from the second arc-shaped oil path Pb into the fourth oil flow path P4.

Both the oil flows in the third and fourth oil flow paths P3 and P4 are caused to impinge on each other substantially at the center portion C to be increased in pressure, and then these oil flows are supplied to the oil passage 51. A portion of the oil which has not flowed into the oil passage 51 is exhausted to the first and second oil flow paths P1 and P2 in the upper and lower sides and is returned to the first and second arc-shaped oil paths Pa and Pb.

Fifth Embodiment

Figure 10:
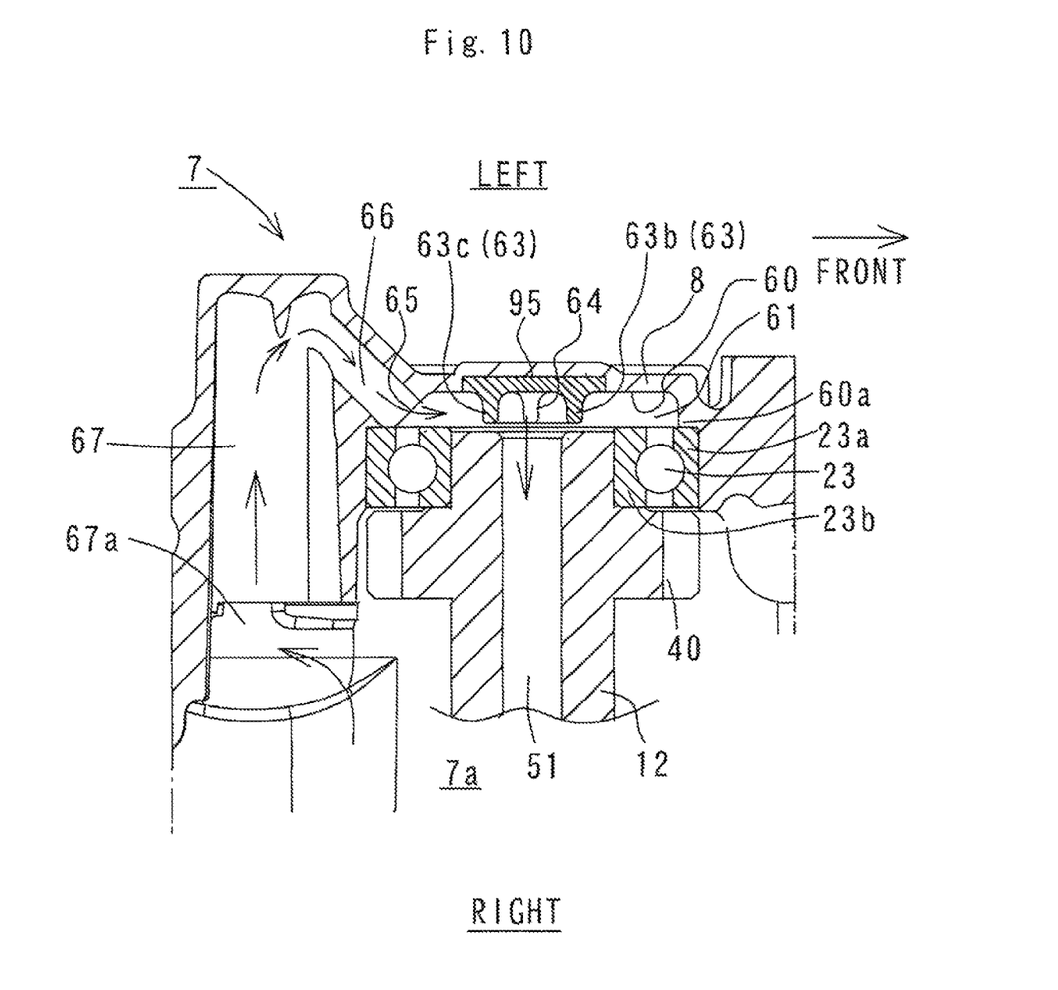
FIG. 10 is a cross-sectional view of a fifth example, which is similar to FIG. 5.

FIG. 10 is a fifth embodiment, which is an embodiment of modification of the first embodiment in FIG. 6. Namely, a first guide rib 63 with a substantially-U shape and a second guide rib 64 with an I shape are formed as members separated from a left side wall 8 of a transmission case 7, and the first and second guide ribs 63 and 64 which are integrated with each other are fixed to the inside of a concave portion 95 formed in the left side wall 8 through press-fitting. As the means for fixing the first and second guide ribs 63 and 64 thereto, it is possible to employ bolts or adhesive agents. The present embodiment has the same structure as that of the first embodiment, except that the first and second guide ribs 63 and 64 are formed as members separated from the left side wall 8, and the same members are designated by the same reference characters.

Other Embodiments (1) In the respective embodiments, the oil chamber is provided in an end portion of the speed-change shaft in the gear-type transmission, and the guide ribs are provided within the oil chamber, in order to enable lubrication from the inside of the speed-change shaft. However, these embodiments can be also applied to lubrication of various types of rotating shafts required to be lubricated from the insides of these shafts.

(2) Although the respective embodiments are applied to a natural supply system utilizing water-head differential pressures, these embodiments can be also applied to forced-lubrication systems using oil pumps.

(3) The present invention is not limited to the structures according to the embodiments and is intended to cover various modification embodiments conceived without departing from the contents defined in the claims.

What is claimed is:

1. A rotating-shaft lubricating apparatus comprising:
   a rotating shaft disposed horizontally;
   a supporting wall adapted to rotatably support an end portion of the rotating shaft in an axial direction, with a bearing interposed therebetween;
   an oil chamber surrounded by the supporting wall and an end surface of the rotating shaft in the axial direction;
   an oil passage opened to the oil chamber through the end surface of the rotating shaft, the oil passage extending in the axial direction within the rotating shaft and communicating with at least one lubricating portion in an outer peripheral surface of the rotating shaft;
   an oil intake portion for receiving oil from outside the oil chamber and for supplying the oil to the oil chamber; and
   a plurality of guide ribs protruding from the supporting wall toward the end portion of the rotating shaft within the oil chamber,
   wherein the plurality of guide ribs includes a first guide rib extending from a radially-outer portion of the oil chamber toward a center portion coincident with an opening of the oil passage, and a second guide rib adjacent to and spaced apart from the first guide rib, the first guide rib and the second guide rib being configured and arranged to form at least two oil flow paths from the radially-outer portion of the oil chamber toward the center portion between the first guide rib and the second guide rib and extending along the plurality of guide ribs.

2. The rotating-shaft lubricating apparatus according to claim 1, wherein the guide ribs are configured such that oil having been pressurized by a centrifugal force from the rotating shaft flows toward the center portion through the respective oil flow paths, and such that at least two or more oil flows flowing opposite to each other impinge upon each other at the center portion so as to press against each other in any of the at least two oil flow paths.

3. The rotating-shaft lubricating apparatus according to claim 1, wherein the plurality of the guide ribs are formed integrally with the supporting wall.

4. The rotating-shaft lubricating apparatus according to claim 1, wherein the plurality of the guide ribs are formed as members separated from the supporting wall.

5. The rotating-shaft lubricating apparatus according to claim 1, wherein:
   the first guide rib is formed to have a substantially-U shape, the first guide rib having a bottom portion surrounding the center portion at its lower side, and having opposite side portions extending upwardly from opposite ends of the bottom portion when viewed in the axial direction of the rotating shaft,
   the second guide rib is formed to have a substantially-I shape extending from the radially-outer portion toward the center portion and protruding between the opposite side portions of the first guide rib having the substantially-U shape, and
   the first guide rib and the second guide rib are configured such that the at least two oil flow paths are formed between opposite side surfaces of the second guide rib having the substantially-I shape and the opposite side portions of the first guide rib having the substantially-U shape.

6. The rotating-shaft lubricating apparatus according to claim 1, wherein:
   the first guide rib is shaped to extend downwardly in a substantially-straight-line from an upper portion of an inner peripheral wall surface and to reach a vicinity of a first end of the center portion in a horizontal direction,
   the second guide rib is shaped to extend upwardly in a substantially-straight-line from a lower portion of the inner peripheral wall surface and to reach a vicinity of a second end of the center portion in the horizontal direction, and
   the at least two oil flow paths are formed respectively along surfaces of the guide ribs which face the center portion.

7. The rotating-shaft lubricating apparatus according to claim 1, wherein:
- the first guide rib comprises a pair of first main guide ribs which extend in the radial direction from outer peripheral ends of the center portion to reach the inner peripheral wall surface, the first main guide ribs being placed to have a phase difference of 180 degrees therebetween about a center of the center portion, and
- the second guide rib comprising a pair of second sub guide ribs which are provided at a substantially-center portion of the oil chamber at positions substantially parallel with the main guide ribs, and
- the respective oil flow paths are formed along side surfaces of the respective first main guide ribs.

8. The rotating-shaft lubricating apparatus according to claim 1, wherein:
- the plurality of the guide ribs comprises four guide ribs including the first guide rib and the second guide rib, the four guide ribs being formed to have a substantially-sectorial shape when viewed in the axial direction of the rotating shaft, and
- the four guide ribs form the at least two oil flow paths intersecting with each other in a substantially-cross shape at the center portion.

9. The rotating-shaft lubricating apparatus according to claim 1, wherein:
- the rotating shaft comprises a speed-change shaft which is one of a plurality of rotating shafts in a gear-type transmission, and
- a plurality of speed-change gears are rotatably supported on the speed-change shaft with a needle bearing interposed therebetween.

\* \* \* \* \*